United States Patent

[11] 3,581,871

| [72] | Inventor | Arthur Walter Forman<br>Northwood, Middlesex, England |
| --- | --- | --- |
| [21] | Appl. No. | 806,906 |
| [22] | Filed | Mar. 13, 1969 |
| [45] | Patented | June 1, 1971 |
| [73] | Assignee | Driver Southall Limited<br>Birmingham, England |
| [32] | Priority | Mar. 19, 1968 |
| [33] | | Great Britain |
| [31] | | 13152/68 |

[54] VIBRATORY FEEDERS
20 Claims, 12 Drawing Figs.

[52] U.S. Cl. ................................................... 198/37,
198/220
[51] Int. Cl. ..................................................... B65g 27/02,
B65g 27/04

[50] Field of Search............................................198/37, 220
(A10), 220 (C10)

[56] References Cited
UNITED STATES PATENTS

| 2,266,906 | 12/1941 | Rapp............................. | 198/37 |
| 2,340,030 | 1/1944 | Weyandt....................... | 198/37 |

*Primary Examiner*—Robert G. Sheridan
*Attorney*—Norris & Bateman

ABSTRACT: A vibratory feed device having a material carrier mounted on an intermediate mass in a manner which permits deflection of the carrier relative to the mass in response to the weight of material thereon, said deflection being in a path distinct from vibratory material feed movement applied to the mass and so transmitted to the carrier. The weight responsive movement is sensed and is used to regulate automatically the rate of flow of material to, on or from the carrier.

PATENTED JUN 1 1971

Inventor

ARTHUR WALTER FORMAN

By Norris + Bateman

Attorney

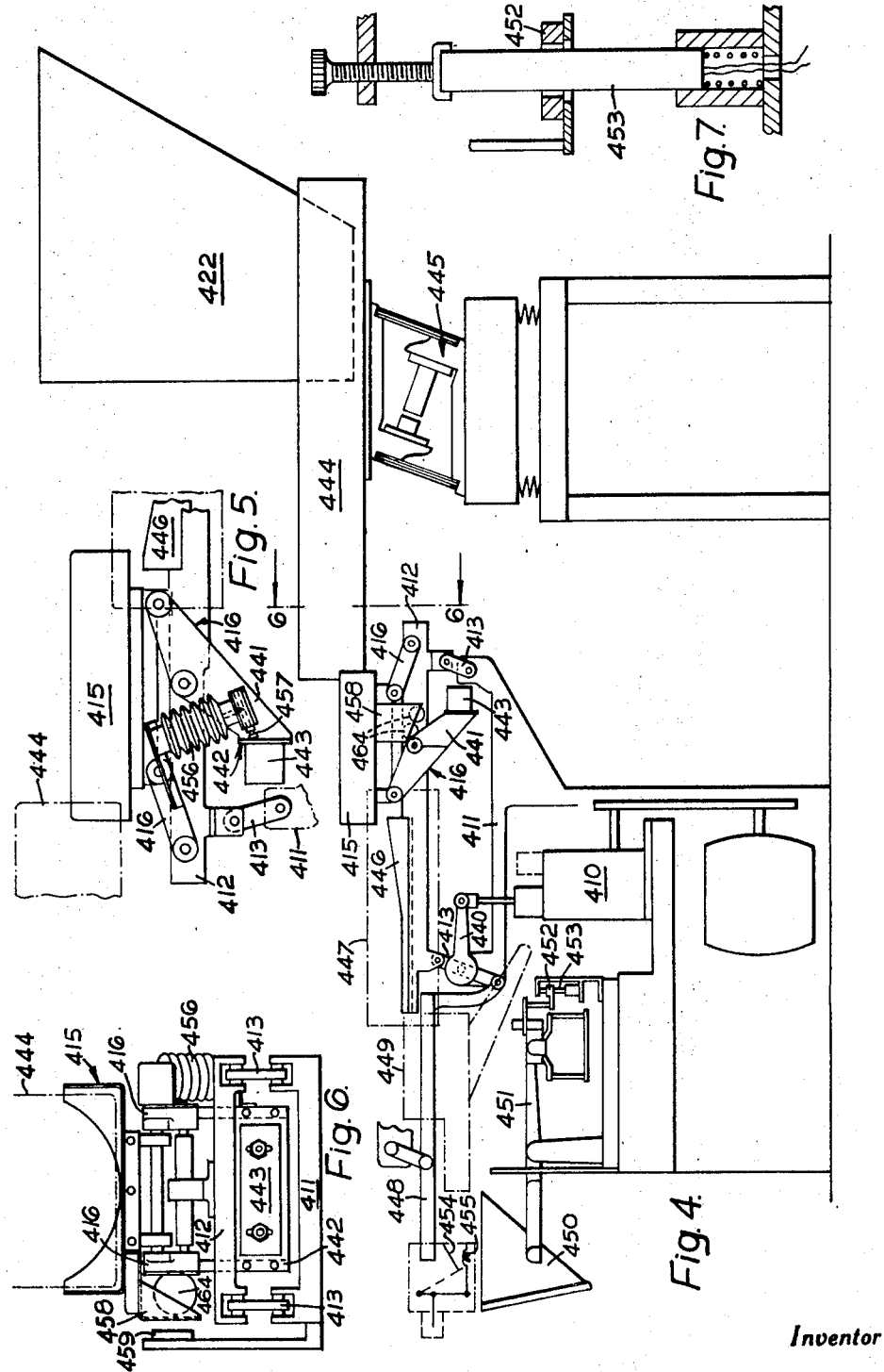

PATENTED JUN 1 1971

Inventor
ARTHUR WALTER FORMAN
By Darris & Bateman
Attorney

VIBRATORY FEEDERS

This invention relates to vibratory feeders and particularly, but not exclusively, to apparatus for feeding particulate or discrete materials at constant rate for filling containers, batch weighing and like applications.

The object of the invention is to provide a vibratory feeder which is operable to feed material at a particularly steady and fine rate and which if of robust and simple construction, convenient in use and easy to set up and adjust.

Known vibratory feeders conventionally comprise a material carrier, for example a trough, mounted above a reaction base on parallel flexures inclined at an angle to the vertical whereby the carrier is constrained for movement in a path at the same angle to the horizontal. Actuating means, for example an electromagnetic or hydraulic impulse unit, serves to vibrate the carrier in said path so that the material is fed therealong, the rate of feed depending on the amplitude and/or frequency of the vibrations.

According to the present invention a vibratory feeder includes a reaction base, an intermediate mass, first mounting means supporting the intermediate mass on the reaction base to constrain said intermediate mass for vibratory feed movement, actuating means for vibration of said mass in said movement, a material carrier, and second mounting means supporting the carrier on the intermediate mass for vibratory movement therewith; characterized in that the second mounting means permits movement of the carrier in proportionate response to the weight of material supported thereon in use in a direction at a substantial vertical angle to the direction of the vibratory feed movement whilst said material is being conveyed along the carrier by said feed movement, the feeder including control means sensitive to the weight responsive movement of the carrier to regulate automatically a flow of the material in accordance with the weight of the component of this flow present on said carrier.

Preferably the direction of the weight responsive movement is substantially perpendicular to the vibratory feed path direction.

Conveniently the control means regulates the flow of material over the carrier in use by interconnection with the actuating means. However said control means may regulate a flow of material on the upstream side before it reaches the carrier, or on the downstream side after leaving said carrier.

Four preferred embodiments of the invention together with certain modifications and variations thereof are now described with reference to the accompanying drawings wherein:

FIG. 4 is a general side view of a second embodiment of the invention forming part of an automatic batch weighing apparatus;

FIG. 5 is a part view of the opposite side of the apparatus shown in FIG. 4;

FIG. 6 is a sectional view on the line 6-6 of FIG. 4;

FIG. 7 is a detail view of a switch device forming part of the apparatus shown in FIGS. 4 to 6;

Figure 1:
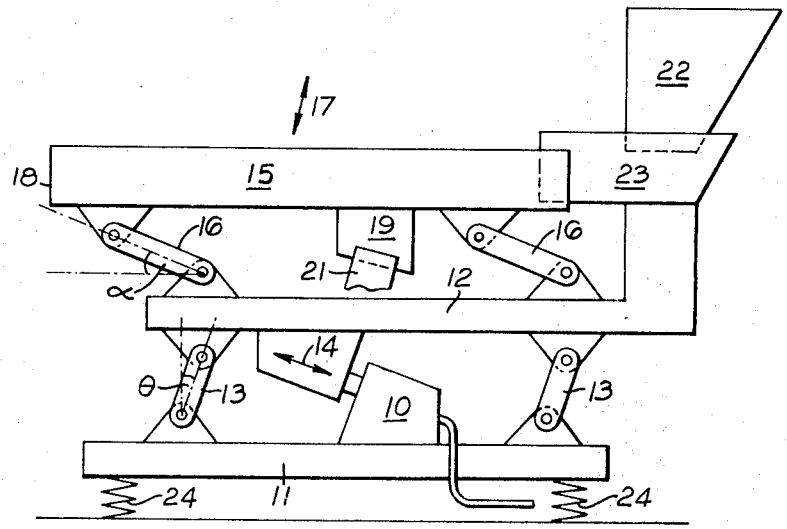
FIG. 1 is a side view of a first embodiment of the invention.
Figure 2:
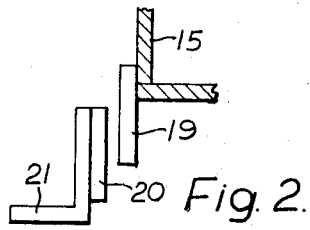
FIG. 2 is a detail of a transducer sensing device forming part of the embodiment shown in FIG. 1.

Referring firstly to FIGS. 1 and 2 a first embodiment of the invention has a reaction base 11 mounting an intermediate mass 12 by means of parallel rubber torsion pivoted links 13 extending at angle $\theta$ to the vertical. An electromagnetic vibrator unit 10 is mounted on base 11 to effect vibration of mass 12 in a substantially rectilinear path constrained by the links 13 in the direction indicated by the arrow 14. A material carrier in the form of a trough 15 is mounted by like torsion pivoted links 16 on the intermediate mass 12, the latter links extending substantially perpendicularly to links 13, that is substantially along the line of thrust of the vibrator indicated by arrows 14 and at angle $\alpha$ to the horizontal, angles $\theta$ and $\alpha$ being equal. Thus trough 15 is constrained by links 16 for movement relative to the intermediate mass 12 in the direction indicated by arrow 17 in response to a weight of material in said trough, said weight responsive movement being in a direction perpendicular to the direction of vibratory movement transmitted from mass 12 along links 16 which latter movement serves to urge the material along the trough towards its open end 18.

A capacitive transducer device (shown in detail in FIG. 2) forms part of control means which, in this embodiment, serves to control actuator 10. The device consists of a vertical metal plate 19 having a lower edge inclined to lie in the path of the said vibratory movement, i.e. at angle to the horizontal, and mounted on trough 15; and a second metal plate 20 mounted on one face of an insulated support bracket 21 secured to a support (not shown) fixed on base 11. Plates 19 and 20 are parallel to each other but spaced a short distance apart and the amount by which their opposing faces overlap is varied according to the weight responsive movement of trough 15, thus varying the capacitance of a control circuit including the plates, and so controlling current input to vibrator unit 10. The inclined lower edge of plate 19 ensures that the control means responds only to the weight responsive movement in direction 17 and not to vibrating movement in the direction 14 relative to base 11.

In use material is fed from a hopper 22 to a primary feed trough 23 which, in this embodiment, forms part of intermediate mass 12 and operates as a vibratory feeder of known type to feed material onto trough 15. If an excess of material reaches trough 15 the transducer device senses the increase in weight and is actuated to vary the action of the vibrator 10 so that material is fed more slowly. If the weight is reduced below a mean quantity the feed rate is increased. A second variable capacitor (not shown) may be connected in parallel to device 19, 20 and manually adjusted to set the mean rate of feed.

Figure 3:
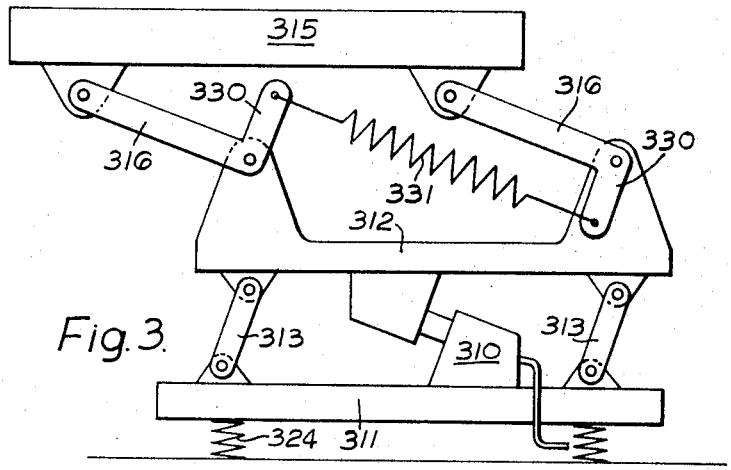
FIG. 3 is a side view of a modification of the embodiment shown in FIGS. 1 and 2.

FIG. 3 shows a variation in construction of the first embodiment as to the manner of mounting of the material carrier on the intermediate mass. In this figure the same reference numerals prefixed by FIG. 3 are used as were used in FIGS. 1 and 2 for parts having the same function. Instead of the links between the trough 315 and intermediate mass 312 having rubber torsion pivots wherein the torsion provides the weight resistant, they are freely pivoted on trunnions formed on the underside of trough 315 and the upper side of mass 312. Links 316 are each in the form of a bellcrank having a second arm 330, said second arms being interconnected by a tension spring 331. The spring serves as the weight resistant and acts to resiliently maintain the links 316 at a mean position as described with reference to the embodiment described above while allowing weight responsive movement of the trough 315. Means may be provided for adjustment of the tension of the spring (not shown). In other respects the operation and control is as previously described.

A second embodiment of the invention forms part of an apparatus for batch weighing shown in FIG. 4. Again parts having the same function have the same reference numerals as were used for the first embodiment but prefixed by a FIG. 4.

A reaction base 411 forming a part of the framework of the apparatus mounts an intermediate mass 412 on parallel pivoted links 413 inclined at an angle to vertical as described in connection with the first embodiment. A drive arm 440 extends from one of the links 413 and is connected to the piston rod of a hydraulic impulse unit 410 of known type for imparting a vibratory motion to mass 412. Material carrier trough 415 is mounted on intermediate mass 412 by four links 416 pivoted on needle bearing pivots. Two of the links 416 have arms 441 extending below the mass 412 and interconnected by a transverse member 442 mounting a counterweight 443 providing a resistant, so supporting trough 415 with the links 416 inclined substantially perpendicularly to links 413. Material is fed along the trough 415 from right to left as viewed in FIG. 4 by the vibration transmitted from intermediate mass 412 when impulse unit 410 is operated.

A conventional vibratory feeder trough 444 is arranged to feed material to carrier trough 415 from a hopper 422; trough 444 is vibrated by a separate electromagnetic unit 445 of known type.

A fine feed trough 446 forms part of intermediate mass 412 and is arranged to receive material fed from the downstream end of trough 415. Trough 446 is of known type having an interior profile adapted to pass a trickle feed of material to its downstream edge but to allow surplus material to fall from its longitudinal edges into a coarse ratefeed trough 447, (indicated by broken lines) also of known type within which trough 446 is located. Fine and coarse feeds are carried onwards by final fine feed trough 448 and coarse feed trough 449 (also indicated by broken lines) of known kind to a weigh-pan 450. Final fine feed trough 448 is vibrated by connection to an extension of one of the links 413, but the coarse rate troughs 447 and 449 are vibrated independently of mass 412. Weigh-pan 450 is mounted on a weighbeam 451 forming part of an automatic-weighing machine of known type. The weighing machine includes a control switch shown in detail in FIG. 7 comprising a ring magnet 452 mounted on the end of the weighbeam 451 remote from pan 450, and surrounding a reed switch 453 mounted on the machine frame and forming part of a control circuit hereinafter described. A trap blade 454 also of known type is mounted adjacent the downstream end of final fine feed trough 448 for operation by a solenoid 455.

Referring further to the carrier trough 415 and its associated mechanism, a flexible thin walled rubber bellows 456 is mounted to one side of the device between one extension arm 441 and the upper end of the parallel link 416 on the same side of the device. The bellows ends are closed except for a narrow bore passage whose effective aperture can be regulated by means of a bleed screw 457. Bellows 456 serves to damp the weight responsive movement of trough 415 to provide smooth operation. Below and to the side of trough 415 opposite to bellows 456 is mounted a cutoff blade 458 which covers a proportionate part of a photoconductive electric cell device 459 mounted on a bracket fixed to base 411 (shown only in FIG. 6); the amount of light reaching said cell device being varied according to the weight responsive relative movement between trough 415 and base 411, an increase in weight in trough 415 reducing the amount of light reaching the cell device from a lamp 464 mounted on the opposite side of blade 458 to the cell device.

The operation and automatic control of the second embodiment of the invention and its associated apparatus is now described with reference to the circuit diagram of FIG. 8. Electromagnetic vibratory unit 445 which feeds material to trough 415 is connected to mains supply 460 through control unit 461 and relay contacts 462. Control unit 461 is connected to the photocell divide 459 to regulate the current supply to unit 445, and so its amplitude of vibration, in proportion to the amount of light falling on the cell device from the lamp 464 as determined by the position of the shutter 458. Mains current is also fed to transformer 463 which supplies current to the lamp 464 through a lamp control unit 465 including a potentiometer 466 manually settable to determine the brightness of the lamp. This adjustment is used to preset the mean amplitude of vibration of feeder 445 and so the mean output of material therefrom, variations in rate are smoothed out by the automatic sensing of weight responsive movement of trough 415 previously described. If desired a capacitance device as described with reference to the first embodiment of the invention, or other known forms of transducer device, can be used for weight sensing instead of the photocell device and lamp arrangement.

The remainder of the circuit is operated from the weighing machine. When material fed to weigh-pan 450 amounts to the required weight beam 451 tilts and moves magnet 452 axially upwards along reed switch 453 closing its contacts and energizing a relay coil 467. This relay has three sets of contacts which are only open when coil 467 is energized the contacts 462 open to cutoff current to the feed vibrator 445; contacts 468 control the hydraulic impulse unit 410 through a solenoid, when open they halt vibration of mass 512 and so feed along trough 415 and fine feed troughs 446, 448; while the third set of contacts 469 deenergized the solenoid 455 of trap blade 454 to catch any material falling from fine feed trough 448. When weigh-pan 450 has discharged its contents the feed cycle begins operation again and carrier trough 415 resumes its control over the electromagnetic feeder 445. Rectifier 470 supplies current for the operation of the control solenoids of hydraulic impulse unit 410 and trap 454.

Apart from adjustment of the brightness of lamp 464 the weight sensitive response of trough 415 can also be varied by altering the mass of counterweight 443, or varying its positioning on member 442, vertical slots permitting the weight to be moved up or down, upwards adjustment making the trough more sensitive to added weight, downwards adjustment reducing the sensitivity. Adjustment may also be effected by varying the positioning of blade 458 relative to the trough 415.

In an alternative construction an electromagnetic vibrator unit is used to actuate mass 412 in place of the hydraulic impulse unit 410.

Figure 9:
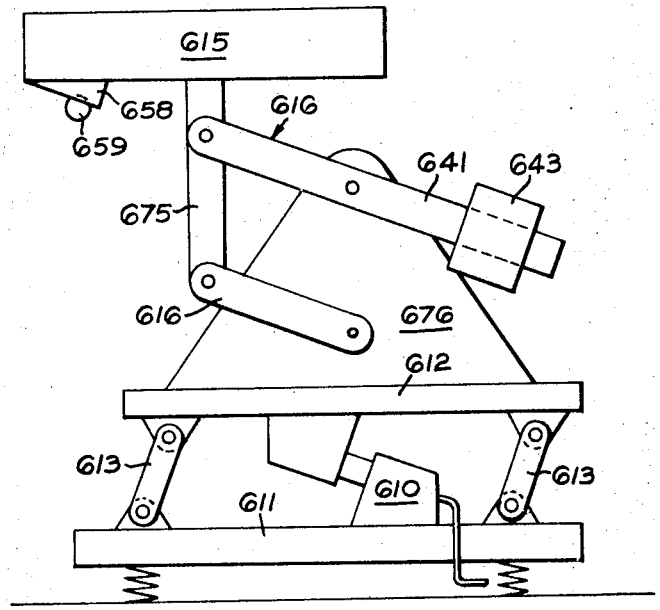
FIG. 9 is a side view of a third embodiment of the invention.

Referring to FIG. 9 a third embodiment of the invention is shown in diagrammatic form, reference numerals being allocated as before, prefixed by FIG. 6. In this embodiment the mounting of intermediate mass 612 on reaction base 611 by means of inclined links 613 and the provision for vibration of mass 612 by a vibrator unit 610 is as previously described, but the mounting of material carrier 615 on the intermediate mass differs from the embodiments described above. Trough 615 is supported on a vertical leg 675 and parallel links pivotally interconnect leg 675 with support member 676 to form a hinged parallelogram linkage operating as a half beam of a Roberval-type weighing apparatus. Uppermost link 616 has an extension portion 641 carrying a counterweight 643 acting in the same way as weight 443 in the embodiment previously described. The operation of this embodiment is as previously described, links 616 have a mean position substantially perpendicular to links 613 and permit weight responsive movement of trough 615 which is sensed by transducer device consisting of a blade 658 and photoelectric cell 659.

Figure 10:
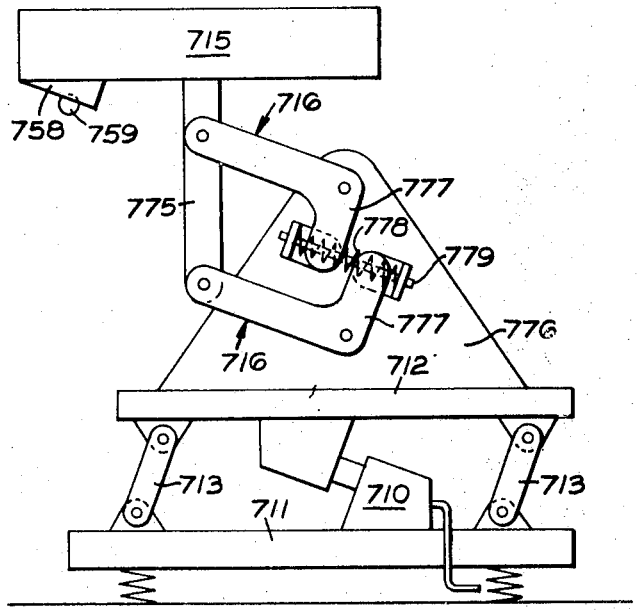
FIG. 10 is a side view of a modification of the embodiment shown in FIG. 9.

FIG. 10 illustrates a modification of the embodiment shown in FIG. 9, reference numerals are allocated as in FIG. 9, but prefixed by numeral 7 instead of 6. In this modification links 716 are in the form of bellcrank levers having arms 777 extending parallel to each other and perpendicularly to the portions of the links which support leg 775. Arms 777 are interconnected by a compression spring 778 located on a rod 779 passing through a bracket on each arm, this spring acting as a resistant in place of the weight 643 used in the form of the embodiment shown in FIG. 9.

Figure 8:
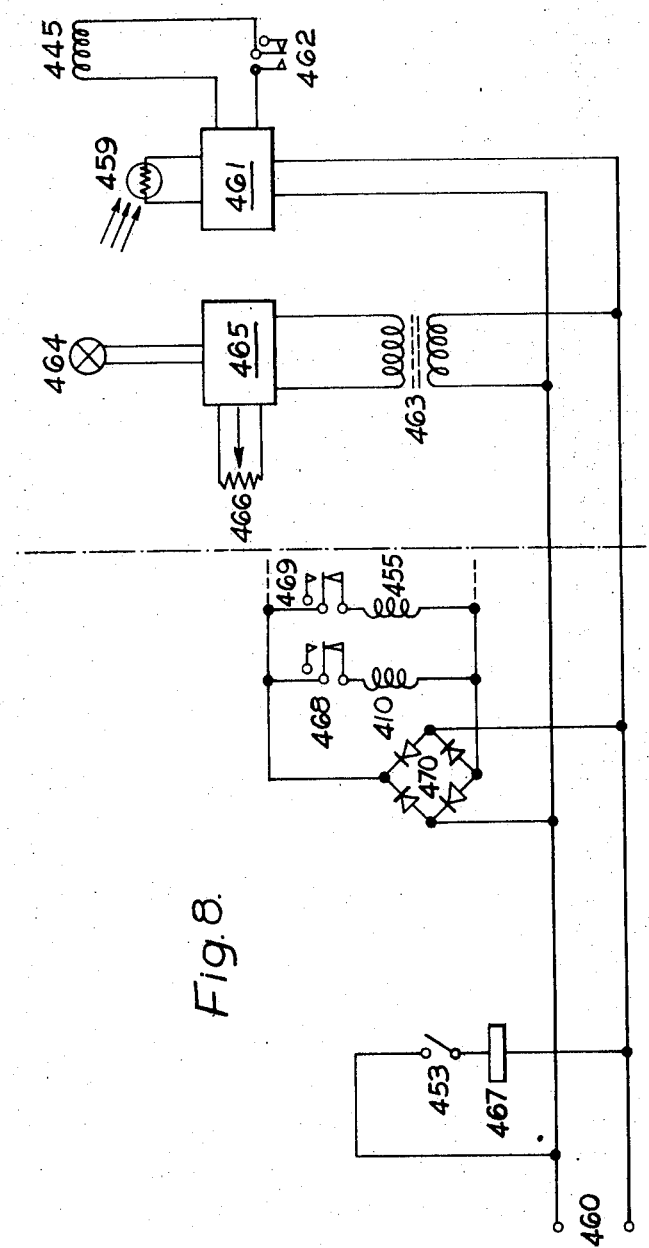
FIG. 8 is a diagram of the control circuit of the apparatus shown in FIGS. 4 to 7.
Figure 11:
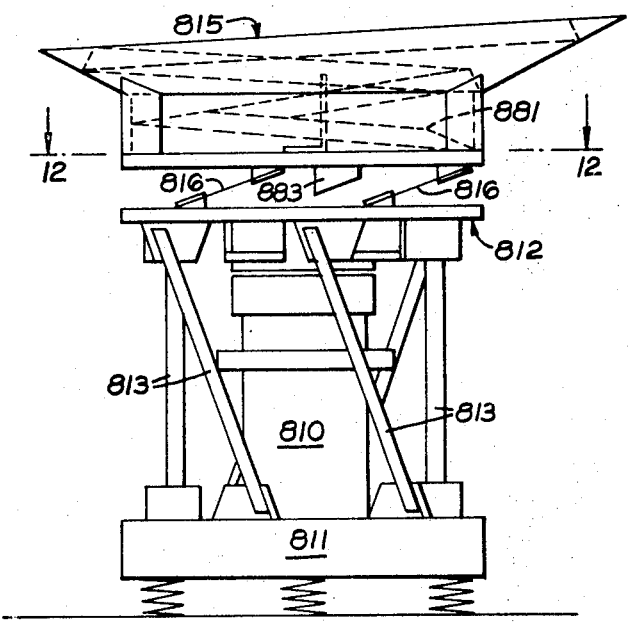
FIG. 11 is a side view of a fourth embodiment of the invention.
Figure 12:
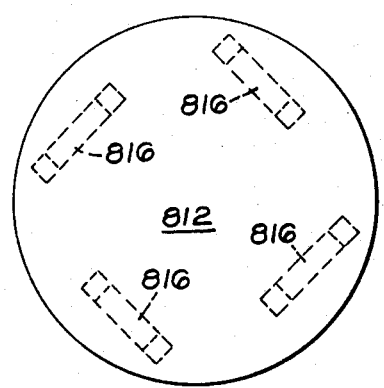
FIG. 12 is a sectional view on line 12-12 of FIG. 11.

The application of the invention to a bowl type vibratory feeder is illustrated in FIGS. 11 and 12, in which reference numerals are allocated as before prefixed by FIG. 8. In this embodiment the material carrier is in the form of a bowl 815 of conventional design incorporating an internal spiral track 881 formed so that material deposited within the base of the bowl is transported therealong to leave the rim of the bowl at 882 when the bowl is vibrated by an inclined and twisting motion in a curvilinear path about its vertical axis. The bowl is resiliently mounted on a horizontal disc-shaped intermediate mass 812 by four inclined flexure strips 816 arranged tangentially adjacent the edge portion of mass 812 as shown in FIG. 12. Mass 812 is in turn mounted on a reaction base 811 by means of further flexure strips 813 each of which extends substantially perpendicularly to a respective strip 816 around mass 812. An electromagnetic vibrator 810 is mounted centrally of base 811 to coact with an armature on the underside of mass 812 whereby it is vibrated in a curvilinear path. Flexures 816 allow weight responsive movement of the bowl in a helical path distinct from the vibratory feed movement thereof and which can be sensed by transducer or other means, indicated generally at 883, as previously described.

It will be appreciated that various transducer devices may be utilized to sense weight responsive movement of the material carrier in any of the embodiments described. In place of the capacitance or photoelectric devices already referred to, other known transducer devices may be used; for example, a proximity detector, a magnet cooperating with a reed switch. Alternatively a bleed valve directly controlling a hydraulic impulse unit or other known nonelectrical transducer device actuated by the weight responsive movement may be used. Control exercised by the weight responsive Movement may be over the actuator which vibrates the intermediate mass itself, and/or over independent feed means feeding material to and/or from the carrier; said independent feed means may be a vibratory feeder as described, or for example a belt conveyor in which case the speed of a drive motor therefor would be regulated, or a speed control device between the motor and the belt drive adjusted.

In all the embodiments described the angle $\theta$, shown in FIG. 1, formed by the longitudinal axes of the links supporting the intermediate mass and the vertical, equals the angle $\alpha$ between the links supporting the material carrier on that mass and horizontal, i.e. the respective links are substantially perpendicular to each other. This is preferred because the vibratory thrust is taken directly along the axes of the upper links (16 in FIG. 1). However it is not essential to the invention that angles $\theta$ and $\alpha$ are equal, in that angle $\alpha$ can be varied to a wide degree while still providing for weight responsive movement of the material carrier so long as this weight responsive movement is capable of being distinguished by the sensing device from the vibratory movement. In practice the angle $\theta$ used for vibratory feed devices lies in the range 15°—≅ and is commonly 20°. Practical embodiments of the invention may have angle $\alpha$ lying in the range 0° to 30°, while keeping weight responsive movement sufficiently independent of the vibratory movement.

It is also preferred that the frequency of vibration of the spring mass system comprising the material carrier and its mountings on the intermediate mass is very low in comparison with the natural frequency and driving frequency of the spring mass system comprising the intermediate mass, and its mountings on the reaction base.

In all embodiments the reaction base may be supported on spring mountings, for example as shown at 24 in FIG. 1.

I claim:

1. A vibratory feeder including a reaction base, an intermediate mass, first mounting means supporting the intermediate mass on the reaction base to constrain said intermediate mass for vibratory feed movement, actuating means for vibration of said mass in said movement, a material carrier, and second mounting means supporting the carrier on the intermediate mass for vibratory movement therewith; characterized in that the second mounting means (16) permits movement of the carrier (15) in proportionate response to the weight of material supported thereon in use in a direction (17) at a substantial vertical angle to the direction (14) of the vibratory feed movement while said material is being conveyed along the carrier by said feed movement, the feeder including control means (19, 21) sensitive to the weight responsive movement of the carrier to regulate automatically a flow of the material in accordance with the weight of the component of this flow present on said carrier.

2. A vibratory feed according to claim 1, characterized in that the direction (17) of weight responsive movement of the carrier (15) is substantially perpendicular to the direction (14) of vibratory feed movement.

3. A vibratory feeder according to claim 1, characterized in that the control means (19, 21) regulates a flow of the material supply to the carrier (15) in use.

4. A vibratory feeder according to claim 1, characterized in that the control means (19, 21) regulates a flow of the material after leaving the carrier (15) in use.

5. A vibratory feeder according to claim 1, characterized in that the control means (19, 21) regulates a flow of the material along the carrier (15) in use.

6. A vibratory feeder according to claim 5, characterized in that the control means (19, 21) regulates the actuating means (10).

7. A vibratory feeder according to claim 1, characterized in that the carrier is a trough (15) and the vibratory movement of the intermediate mass (12) conveys the material in a substantially rectilinear path towards one end of the trough.

8. A vibratory feeder according to claim 1, characterized in that the carrier is a bowl (815) having an internal spiral track (881) sloping upwards and increasing in radius between the bottom and the rim of the bowl, and the vibratory movement of the intermediate mass (812) moves the material in a substantially curvilinear path along said track towards the rim.

9. A vibratory feeder according to claim 1, characterized in that the intermediate mass (412) includes a material receiver (446) adapted to receive and feed a flow of the material from the first carrier (415) when the intermediate mass is vibrated in use.

10. A vibratory feeder according to claim 1, characterized in that the intermediate mass (12) includes a trough (23) adapted to feed a supply of the material to the carrier (15) when the intermediate mass is vibrated in use.

11. A vibratory feeder according to claim 1, characterized in that the second mounting means comprises a plurality of link members (16) of equal length extending between the intermediate mass (12) and the material carrier (15) and resiliently urged to a position from which they are deflected by a weight of material on the carrier.

12. A vibratory feeder according to claim 11, characterized in that each link member is a flexure strip (816).

13. A vibratory feeder according to claim 11, characterized in that each link member (16) is rigid and is pivotally connected to the intermediate mass (12) and the material carrier (15).

14. A vibratory feeder according to claim 13, characterized in that the links (316) are resiliently urged to said position by spring means (331).

15. A vibratory feeder according to claim 14, characterized in that the links (416) are resiliently urged to said position by a counterweight (443).

16. A vibratory feeder according to claim 1, characterized in that the second mounting means comprises a vertical leg (675) fixedly mounting the material carrier (615), a trunnion (676) fixedly mounted on the intermediate mass (612) and a pair of parallel stay members (616) pivotally interconnecting the leg and the trunnion, the axes of the pivots in the leg lying in a vertical plane parallel to a vertical plane in which the axes of the pivots in the trunnion lie so as to form a parallelogrammic linkage of one half of a weighbeam of the Roberval type.

17. A vibratory feeder according to claim 16, characterized in that the stay members (616) are resiliently urged to a mean position under average loading of the carrier (615) at which the longitudinal axes of said stay members lie along the direction of the vibratory feed movement.

18. A vibratory feeder according to claim 17, characterized in that the stay members (616) are resiliently urged to the mean position by a counterweight (643) mounted on an extension (641) of one of said members.

19. A vibratory feeder according to claim 17, characterized in that the stay members (716) are resiliently urged to the mean position by spring means (778) acting on relatively movable parts (777) of the parallelogrammic linkage.

20. A vibratory feeder according to claim 1 characterized by a vibration damping device (456) mounted between the material carrier (415) and the intermediate mass (412).